(12) United States Patent
Arai et al.

(10) Patent No.: US 11,542,416 B2
(45) Date of Patent: Jan. 3, 2023

(54) SUCTION FIXING SHEET

(71) Applicant: NITTO DENKO CORPORATION, Osaka (JP)

(72) Inventors: Masahiro Arai, Osaka (JP); Hiromitsu Morishita, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 305 days.

(21) Appl. No.: 16/645,691

(22) PCT Filed: Sep. 12, 2018

(86) PCT No.: PCT/JP2018/033889
§ 371 (c)(1),
(2) Date: Mar. 9, 2020

(87) PCT Pub. No.: WO2019/054421
PCT Pub. Date: Mar. 21, 2019

(65) Prior Publication Data
US 2020/0277518 A1 Sep. 3, 2020

(30) Foreign Application Priority Data
Sep. 12, 2017 (JP) .............................. JP2017-175038

(51) Int. Cl.
*C09J 7/38* (2018.01)
*C09J 7/26* (2018.01)
(Continued)

(52) U.S. Cl.
CPC .................. *C09J 7/385* (2018.01); *C09J 7/26* (2018.01); *C09J 133/04* (2013.01); *C09J 183/04* (2013.01);
(Continued)

(58) Field of Classification Search
None
See application file for complete search history.

(56) References Cited

U.S. PATENT DOCUMENTS

2005/0074606 A1   4/2005   Nishiyama et al.
2012/0258247 A1*  10/2012  Niwa .................... C09J 139/04
                                                  526/260

FOREIGN PATENT DOCUMENTS

JP        9-22935 A       1/1997
JP        10-85317        4/1998
(Continued)

OTHER PUBLICATIONS

Wano, T et al., Double Sided Pressure Sensitive Adhesive Tape, Oct. 2, 2003, machine translation of JP2003-277702A (Year: 2003).*

(Continued)

*Primary Examiner* — Chinessa T. Golden
(74) *Attorney, Agent, or Firm* — Greenblum & Bernstein, P.L.C.

(57) ABSTRACT

The suction fixing sheet of the present disclosure is a suction fixing sheet to be placed on a suction surface of a suction device to prevent contact between a suction target and the suction surface. The suction fixing sheet includes a porous sheet having air permeability in its thickness direction; and a double-sided pressure-sensitive adhesive sheet provided with a substrate, having air permeability in its thickness direction, and disposed on one surface of the porous sheet, or a double-sided pressure-sensitive adhesive layer unprovided with a substrate, formed of a crosslinked pressure-sensitive adhesive, having air permeability in its thickness direction, and disposed on one surface of the porous sheet. The ratio of the thickness of the porous sheet to the thickness of the double-sided pressure-sensitive adhesive sheet or the double-sided pressure-sensitive adhesive layer is 8.0 or more.

14 Claims, 4 Drawing Sheets

(51) Int. Cl.
*C09J 133/04* (2006.01)
*C09J 183/04* (2006.01)

(52) U.S. Cl.
CPC ...... *C09J 2203/00* (2013.01); *C09J 2423/046* (2013.01)

(56) References Cited

FOREIGN PATENT DOCUMENTS

| | | | | |
|---|---|---|---|---|
| JP | 2003-277702 | A | 10/2003 | |
| JP | 2003277702 | A * | 10/2003 | ............ C09J 133/08 |
| JP | 2003-313516 | A | 11/2003 | |
| JP | 2005-105212 | A | 4/2005 | |
| JP | 5597671 | B2 | 10/2014 | |

OTHER PUBLICATIONS

Official Communication issued in International Bureau of WIPO Patent Application No. PCT/JP2018/033889, dated Oct. 30, 2018, along with an English translation thereof.
Japan Official Action received in JP Application No. 2018-170979, dated Feb. 1, 2022.

\* cited by examiner

SUCTION FIXING SHEET

TECHNICAL FIELD

The present invention relates to a suction fixing sheet to be placed on a suction surface of a suction device to prevent contact between a suction target and the suction surface.

BACKGROUND ART

Steps of processing a thin and light sheet-like body such as a metal foil, a plastic film, or a ceramic green sheet for use in production of ceramic capacitors conventionally involve fixing or conveying the sheet-like body while holding the sheet-like body on a suction surface of a suction device by suction. At this time, it has been common practice to place an air-permeable suction fixing sheet on the suction surface. The suction fixing sheet placed on the suction surface prevents direct contact between the sheet-like body, which is a suction target, and the suction surface. This can prevent damage to the suction target, formation of scratches on the suction surface, contamination of the suction surface with components contained in the suction target, and the like during the suction holding of the suction target. The scratches on the suction surface and the contamination of the suction surface can cause defects in suction targets to be subsequently suction-held on the suction surface.

Patent Literature 1 discloses a suction fixing sheet that includes a porous sheet made of ultrahigh molecular weight polyethylene and a hot-melt pressure-sensitive adhesive disposed on one side of the porous sheet. The suction fixing sheet of Patent Literature 1 is used in a state of being fixed to a suction surface of a suction device with the hot-melt pressure-sensitive adhesive.

Patent Literature 2 discloses a suction fixing sheet that includes a porous sheet made of ultrahigh molecular weight polyethylene and a double-sided pressure-sensitive adhesive tape bonded to the porous sheet. The double-sided pressure-sensitive adhesive tape is provided with a plurality of through holes, and the adhesive strengths of both surfaces thereof are different from each other. The suction fixing sheet of Patent Literature 2 is used in a state of being fixed to a suction surface of a suction device with the double-sided pressure-sensitive adhesive tape.

CITATION LIST

Patent Literatures

Patent Literature 1: JP 09(1997)-22935 A
Patent Literature 2: JP 2003-277702 A

SUMMARY OF INVENTION

Technical Problem

It is expected that suction targets would become larger and larger to attain, e.g., improvement of processing efficiency, and this, in turn, would lead to an increase in the area of suction fixing sheets. A suction fixing sheet is usually used in a state of being fixed to a suction surface of a suction device with a pressure-sensitive adhesive. As the area of the suction fixing sheet increases, the suction fixing sheet is more likely to be loosened or become wrinkled at the time of placing the suction fixing sheet on the suction surface of the suction device. Unlike the case where the suction fixing sheet is placed in a freely movable manner without using a pressure-sensitive adhesive, a portion of the suction fixing sheet that has come into contact with the suction surface first as a result of the loosening or wrinkling serves as an anchor, whereby, at the time of fixing the sheet to the suction surface, lifting of the sheet and displacement of the sheet from a correct fixing position (hereinafter "displacement from a correct fixing position" is simply referred to as "displacement") are more likely to occur. Further, for example, during a suction pressing process in which a suction target is subject to pressing in a state of being suction-held, the suction fixing sheet may be exposed to a high processing temperature. According to the studies conducted by the inventors of the present invention, when the suction fixing sheet is used under high temperature conditions, lifting and displacement may newly occur in the sheet that has been fixed to the suction surface, and the degree of such lifting and displacement tends to increase with an increase in the area of the sheet.

The lifting and displacement of the suction fixing sheet may cause unintended deformation of the suction target or surface damage to the suction target. In particular, when the suction target is a non-self-supporting thin sheet-like body, the deformation and the damage caused by the lifting and displacement of the suction fixing sheet as described above are more likely to occur in the suction target. In addition, it is also desirable to avoid the deformation and damage caused by the structure of the suction fixing sheet itself as much as possible. However, these problems and solutions thereto are not at all described in Patent Literatures 1 and 2.

It is an object of the present invention to provide a suction fixing sheet that is unlikely to cause unintended deformation of a suction target or surface damage to the suction target even when the area of the sheet is increased or the sheet is used under high temperature conditions.

Solution to Problem

The present invention provides a suction fixing sheet to be placed on a suction surface of a suction device to prevent contact between a suction target and the suction surface, including: a porous sheet having air permeability in its thickness direction; and (1) a double-sided pressure-sensitive adhesive sheet provided with a substrate and having air permeability in its thickness direction, the double-sided pressure-sensitive adhesive sheet being disposed on one surface of the porous sheet, or (2) a double-sided pressure-sensitive adhesive layer unprovided with a substrate, formed of a crosslinked pressure-sensitive adhesive, and having air permeability in its thickness direction, the double-sided pressure-sensitive adhesive layer being disposed on one surface of the porous sheet, wherein a ratio of a thickness of the porous sheet to a thickness of the double-sided pressure-sensitive adhesive sheet or the double-sided pressure-sensitive adhesive layer is 8.0 or more.

Advantageous Effects of Invention

According to the suction fixing sheet of the present invention in which the above-described double-sided pressure-sensitive adhesive sheet (1) is disposed on the one surface of the porous sheet, even if the area of the suction fixing sheet is large, loosening and wrinkling of the suction fixing sheet at the time of placing the suction fixing sheet on the suction surface of the suction device are unlikely to occur owing to the presence of the substrate of the double-sided pressure-sensitive adhesive sheet. On the other hand, according to the suction fixing sheet of the present invention in which the above-described double-sided pressure-sensitive adhesive layer (2) is disposed on the one surface of the porous sheet, even if the area of the suction fixing sheet is large, loosening and wrinkling of the suction fixing sheet at the time of placing the suction fixing sheet on the suction surface of the suction device are unlikely to occur owing to the low deformability of the crosslinked pressure-sensitive adhesive contained in the double-sided pressure-sensitive adhesive layer. Thus, whereas lifting and displacement of the suction fixing sheet may occur at the time of fixing the sheet to the suction surface if the suction fixing sheet is fixed in the state of being loosened or wrinkled to cause a portion thereof to be anchored to the suction surface, the suction fixing sheet of the present invention suppresses the occurrence of such lifting and displacement.

The studies conducted by the inventors of the present invention revealed that, when a suction fixing sheet is used under high temperature conditions, the flowability of a pressure-sensitive adhesive increases, whereby lifting and displacement of the suction fixing sheet once fixed to a suction surface are more likely to newly occur. Besides, since the amounts of displacement accumulate in the planar direction, the degree of displacement increases as the area of the sheet increases. In particular, in a suction pressing process, the pressure-sensitive adhesive is caused to flow by the pressure applied to the suction fixing sheet, whereby the above-described lifting and displacement are still more likely to occur. According to the suction fixing sheet of the present invention in which the above-described double-sided pressure-sensitive adhesive sheet (1) is disposed on the one surface of the porous sheet, the substrate of the double-sided pressure-sensitive adhesive sheet restricts the flow of the pressure-sensitive adhesive, whereby new occurrence of lifting and displacement of the suction fixing sheet once fixed to the suction surface is suppressed. On the other hand, according to the suction fixing sheet of the present invention in which the above-described double-sided pressure-sensitive adhesive layer (2) is disposed on the one surface of the porous sheet, the new occurrence of lifting and displacement of the suction fixing sheet once fixed to the suction surface is suppressed owing to the low flowability of the crosslinked pressure-sensitive adhesive under high temperature conditions.

In addition, in the suction fixing sheet according to the present invention, the ratio of the thickness of the porous sheet to the thickness of the double-sided pressure-sensitive adhesive sheet or the double-sided pressure-sensitive adhesive layer is set to 8.0 or more. This configuration can reduce the degree to which the shape of the structure that imparts the air permeability in the thickness direction to the double-sided pressure-sensitive adhesive sheet or the double-sided pressure-sensitive adhesive layer is transferred to a suction target (in particular, a suction target that is a non-self-supporting thin sheet-like body) by the suction force during suction holding, and in a suction pressing process, further by the pressing pressure. That is, the suction fixing sheet of the present invention suppresses the occurrence of unintended deformation of the suction target or surface damage to the suction target caused by the structure of the suction fixing sheet itself.

Therefore, the present invention can provide a suction fixing sheet that is unlikely to cause unintended deformation of a suction target or surface damage to the suction target even when the area of the sheet is increased or the sheet is used under high temperature conditions.

DESCRIPTION OF EMBODIMENTS

Hereinafter, embodiments of the present invention will be described with reference to the drawings. The present invention is not limited to the embodiments to be described below.

Suction Fixing Sheet

First Embodiment

Figure 1:
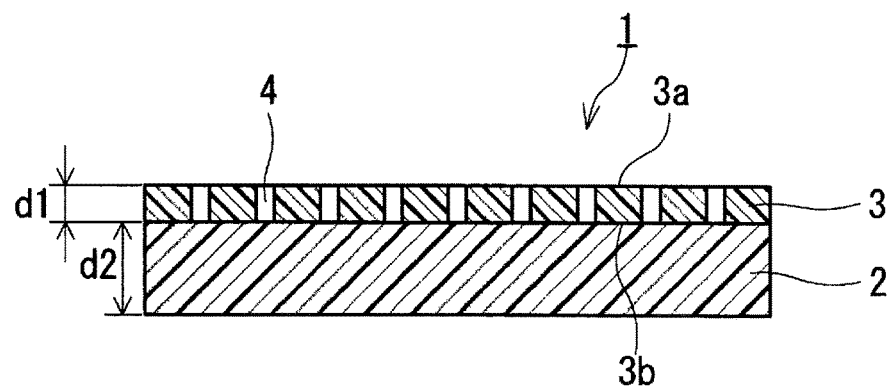
FIG. 1 is a cross-sectional view schematically showing an example of a suction fixing sheet of the present invention.

FIG. 1 shows an example of a suction fixing sheet according to a first embodiment. The suction fixing sheet 1 shown in FIG. 1 includes a porous sheet 2 having air permeability in its thickness direction and a double-sided pressure-sensitive adhesive sheet (hereinafter, referred as "double-sided adhesive sheet") 3 having air permeability in its thickness direction. The double-sided adhesive sheet 3 is disposed on one surface of the porous sheet 2. The double-sided adhesive sheet 3 has a substrate. The double-sided adhesive sheet 3 has a plurality of through holes 4 that pass through the sheet 3 in the thickness direction. The ratio d2/d1 of the thickness d2 of the porous sheet 2 to the thickness d1 of the double-sided adhesive sheet 3 is 8.0 or more. In the suction fixing sheet 1 of the first embodiment, air permeability in its thickness direction is imparted by the porous sheet 2 and the through holes 4 of the double-sided adhesive sheet 3. Thus, the suction fixing sheet 1 can be used as a suction fixing sheet to be placed on a suction surface of a suction device to prevent contact between a suction target and the suction surface. The suction fixing sheet 1 of the first embodiment is placed and fixed on a suction surface of a suction device in such a manner that the double-sided adhesive sheet 3 is in contact with the suction surface. FIG. 1 and each of the drawings to be subsequently referred to do not necessarily exactly reflect the actual scales of respective components in the suction fixing sheet for the sake of easy-view of the drawings and simplicity of explanation. For example, the through holes 4 are shown enlarged. As used herein, the term "thickness direction" of a sheet or a layer means any direction that connects one surface and the other surface of the sheet or the layer. For example, although the through holes 4 extend in a direction perpendicular to surfaces 3a and 3b of the double-sided adhesive sheet 3 in the example shown in FIG. 1, the direction in which the through holes 4 extend is not limited to this perpendicular direction. As long as the through holes 4 connect the one surface 3a and the other surface 3b of the double-sided adhesive sheet 3, the direction in which the through holes 4 extend may be inclined with respect to the perpendicular direction.

In the first embodiment, the ratio d2/d1 may be 9.0 or more, 10.0 or more, or even 11.0 or more, because the degree to which the shape of the openings of the through holes 4 is transferred to a suction target during suction holding can be suppressed more reliably as the thickness of the porous sheet 2 becomes relatively larger. The upper limit of the ratio d2/d1 is, for example, 30.0 or less. The double-sided adhesive sheet 3 usually does not have air permeability in its lateral direction (the in-plane direction of the sheet), whereas the porous sheet 2 may have air permeability in its lateral direction. When the ratio of the thickness of the porous sheet 2 to the thickness of the double-sided adhesive sheet 3 is too large, this may cause, if the porous sheet 2 has air permeability in the lateral direction, the suction fixing sheet 1 to have an excessively large amount of air permeation in the lateral direction at a portion provided with the porous sheet 2. This may hinder favorable suction holding of the suction target. From this perspective, the upper limit of the ratio d2/d1 may be 20.0 or less or even 15.0 or less.

Figure 2:
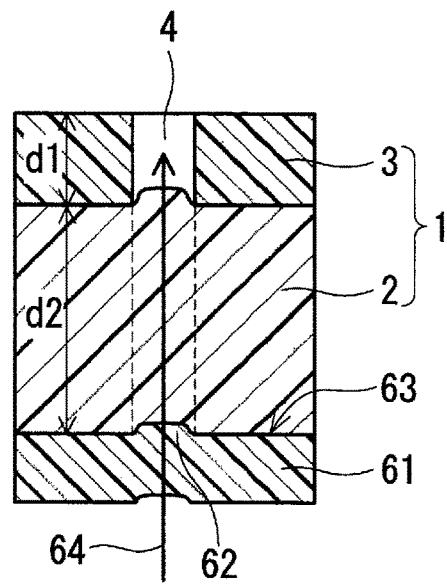
FIG. 2 is a schematic view for illustrating deformation of a suction target during suction holding with the use of a suction fixing sheet in which a double-sided pressure-sensitive adhesive sheet having through holes is disposed on one surface of a porous sheet.

In the first embodiment, the shape of the structure that imparts air permeability in the thickness direction to the double-sided adhesive sheet 3 is typically the shape of the openings of the through holes 4. The transfer of the shape of the openings of the through holes 4 to a suction target during suction holding refers to, for example, as shown in FIG. 2, formation of a protrusion 62 corresponding to the shape of the opening of each through hole 4 on a surface (surface in contact with the suction fixing sheet 1) 63 of a suction target 61 by the suction force generated by air suction 64 during the suction holding. In this case, it is considered that the greater the height of the protrusions 62 from the surface 63, the greater the degree to which the shape of the openings of the through holes 4 is transferred during the suction holding. In a suction pressing process, a pressure is applied to the suction fixing sheet 1 and the suction target 61, and this causes the formation of the protrusions 62 to be more likely to occur.

In the suction fixing sheet 1 of the first embodiment, the double-sided adhesive sheet 3 is disposed over the one entire surface of the porous sheet 2. More specifically, in the suction fixing sheet 1 of the first embodiment, the double-sided adhesive sheet 3 having the same shape as the porous sheet 2 is disposed on the one surface of the porous sheet 2 in such a manner that the double-sided adhesive sheet 3 and the porous sheet 2 fully overlap each other when viewed in a direction perpendicular to the surfaces of the suction fixing sheet 1. In the suction fixing sheet of the first embodiment, the double-sided adhesive sheet 3 need not be disposed over the one entire surface of the porous sheet 2. However, in order to obtain the above-described effects more reliably, it is preferable that the double-sided adhesive sheet 3 is disposed on the entire one surface of the porous sheet 2 at least in a region to be in contact with a suction target during suction holding of the suction target by a suction device.

The porous sheet 2 is, for example, a woven fabric, a nonwoven fabric, a film (metal film, resin film, or the like) that is perforated in its thickness direction, a sintered sheet of resin particles, and is preferably a sintered sheet of resin particles. When the porous sheet 2 is the sintered sheet, it is possible to avoid adhesion of foreign substances to a suction target resulting from shedding of fibers, and also to avoid deformation of a suction target and surface damage to the suction target caused by the foreign substances. In addition, void spaces between the particles are present all over the porous sheet 2, and they can serve as air flow paths in the porous sheet 2. This enables more uniform suction holding of a suction target. It is to be noted, however, that the porous sheet 2 is not limited to the above examples as long as the porous sheet 2 has air permeability in its thickness direction.

The resin as a component of the resin particles is preferably ultrahigh molecular weight polyethylene (hereinafter referred to as "UHMWPE") in terms of excellent wear resistance and impact resistance of the porous sheet 2 formed thereof. That is, the porous sheet 2 is preferably a sintered sheet of UHMWPE particles. It is to be noted, however, that the resin as a component of the resin particles is not limited as long as the porous sheet 2 can be formed by sintering. The weight-average molecular weight Mw of UHMWPE is, for example, 500,000 or more and preferably 1,000,000 or more. The weight-average molecular weight of UHMWPE can be evaluated by high-temperature gel permeation chromatography (high-temperature GPC).

The sintered sheet of UHMWPE particles can be produced by known methods such as, for example, methods 1 to 3 to be described below. The method 1 is a method in which UHMWPE particles are sintered in a state of being filled in a mold to form a sintered block of the UHMWPE and the thus-formed sintered block is processed into a sheet by cutting. The sintered block may have a cylindrical shape. The method 2 is a method in which UHMWPE particles are sintered in a state of being filled in a sheet shape. The method 3 is a method in which a slurry obtained by dispersing UHMWPE particles in a dispersion medium is applied to a transfer sheet, which is typically a metal sheet, to form a coating having a predetermined thickness and the coating is then heated to a temperature equal to or higher than the melting point of the UHMWPE to obtain a sheet-shaped sintered body. The surface of the transfer sheet to which the slurry is applied may have been subjected to a release treatment. In any of these methods, UHMWPE particles having an average particle diameter of 20 to 500 µm can be used, for example.

The thickness of the porous sheet 2 is, for example, 0.050 mm to 3.0 mm, and may be 0.1 mm to 2.0 mm or even 0.2 mm to 1.5 mm. When the thickness of the porous sheet 2 falls within these ranges, the above-described effects can be obtained more reliably. When the thickness of the porous sheet 2 is too small, the degree to which the shape of the openings of the through holes 4 of the double-sided adhesive sheet 3 is transferred to a suction target during suction holding may be greater. When the thickness of the porous sheet 2 is too large, this may cause, in the case where the porous sheet 2 has air permeability in the lateral direction such as the case where the porous sheet is a sintered sheet of resin particles, the suction fixing sheet 1 to have an excessively large amount of air permeation in the lateral direction at a portion provided with the porous sheet 2. This may hinder favorable suction holding of the suction target.

The air permeability of the porous sheet 2 in the thickness direction is, for example, 0.5 $cm^3/(cm^2 \cdot sec)$ to 20 $cm^3/(cm^2 \cdot sec)$ as expressed in terms of Frazier number measured according to Method A for air permeability measurement (Frazier method) prescribed in JIS L 1096: 2010 (hereinafter the Frazier number measured by this method is simply referred to as "Frazier number"). The lower limit of the air permeability as expressed in terms of Frazier number may be 1.0 cm$^3$/(cm$^2$·sec) or more, 2.0 cm$^3$/(cm$^2$·sec) or more, more than 2.0 cm$^3$/(cm$^2$·sec), 2.5 cm$^3$/(cm$^2$·sec) or more, or even 3.0 cm$^3$/(cm$^2$·sec) or more. The upper limit of the air permeability as expressed in terms of Frazier number is, for example, 10 cm$^3$/(cm$^2$·sec) or less, and may be 8.0 cm$^3$/(cm$^2$·sec) or less. The porous sheet 2 preferably has high air permeability in the thickness direction from the viewpoint of allowing the time (takt time) required for suction-holding a suction target to be reduced. However, the porous sheet 2 with high air permeability generally has a high porosity, which may deteriorate the properties required for the suction fixing sheet 1, such as strength, wear resistance, and impact resistance. When the air permeability of the porous sheet 2 in the thickness direction falls within the above-described ranges, the balance between the takt time and the above-described respective properties becomes more favorable especially in the case where the porous sheet 2 is a sintered sheet of resin particles.

The porosity of the porous sheet 2 is, for example, 15% to 50%, and may be 20% to 45%. When the porosity of the porous sheet 2 falls within these ranges, the balance between the takt time and the above-described properties becomes still more favorable especially in the case where the porous sheet 2 is a sintered sheet of resin particles. The porosity of the porous sheet 2 can be determined from the volume V (cm$^3$), the true specific gravity D (g/cm$^3$), and the mass M (g) of the porous sheet as per the following equation: Porosity (%)={1−M/(V×D)}×100.

The surface roughness of the porous sheet 2, in particular, the surface roughness of the surface of the porous sheet 2 to be in contact with a suction target during suction holding is preferably 1.0 µm or less and more preferably 0.5 µm or less as expressed in terms of arithmetic average surface roughness Ra prescribed in JIS B 0601: 2001. When Ra of the porous sheet 2 falls within these ranges, unintended deformation of the suction target or surface damage to the suction target during suction holding caused by the contact with the porous sheet 2 can be suppressed more reliably. When the porous sheet 2 is a sintered sheet of resin particles, Ra can be set so as to fall within the above-described ranges relatively easily. The surface roughness of the sheet can be controlled by, for example, adjusting the particle diameter of the resin particles.

The porous sheet 2 may have a single-layer structure, or may have a laminate structure composed of two or more layers having different properties and/or structures.

In the double-sided adhesive sheet 3, the through holes 4 connect one surface and the other surface of the double-sided adhesive sheet 3 to each other, thereby serving as air flow paths of the double-sided adhesive sheet 3 in the thickness direction. The through holes 4 impart air permeability in the thickness direction to the double-sided adhesive sheet 3.

Figure 3:
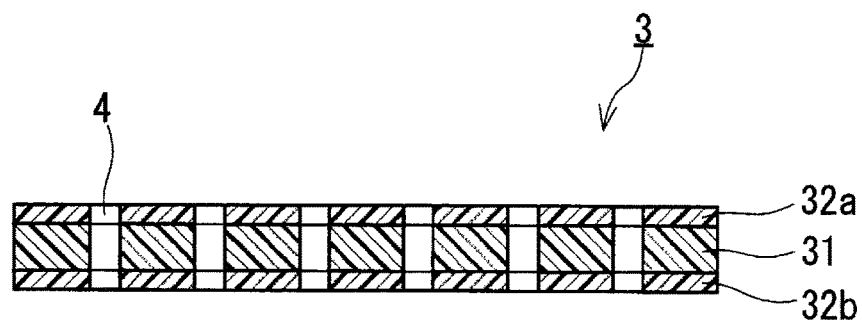
FIG. 3 is a cross-sectional view schematically showing an example of a double-sided pressure-sensitive adhesive sheet that may be included in the suction fixing sheet of the present invention.

FIG. 3 shows an example of the double-sided adhesive sheet 3. The double-sided adhesive sheet 3 shown in FIG. 3 includes a substrate 31, a pressure-sensitive adhesive layer 32a formed on one surface of the substrate 31, and a pressure-sensitive adhesive layer 32b formed on the other surface of the substrate 31. The through holes 4 pass through the substrate 31 and the pressure-sensitive adhesive layers 32a and 32b.

The substrate 31 may be a film that does not have any air flow paths connecting one surface and the other surface except for the through holes 4. More specifically, the substrate 31 may be a film obtained by forming the through holes 4 in a non-porous film.

The material of the substrate 31 is a resin, for example. Examples of the resin include: polyolefins such as polyethylene and polypropylene; polyesters such as polyethylene terephthalate (PET); polycarbonate (PC); acrylic resins; and butyl rubber. The resin is preferably PET or PC, and more preferably PET. PET and PC are relatively hard resin materials, and even when the area of the suction fixing sheet 1 large, the suction fixing sheet 1 is unlikely to be loosened or wrinkled at the time of placing the sheet 1 on the suction surface. Further, PET and PC can maintain sufficient strength even in an environment at high temperatures (e.g., near the melting temperatures of hot-melt pressure-sensitive adhesives). The material of the substrate 31 is not limited to the above examples.

The substrate 31 may be a film obtained by forming the through holes 4 in a non-porous resin film, and may be a film obtained by forming the through holes 4 in a non-porous PET film.

The thickness of the substrate 31 is, for example, 0.005 mm to 1.0 mm, and may be 0.01 mm to 0.5 mm. When the thickness of the substrate 31 falls within these ranges, the above-described effects can be obtained more reliably. If the thickness of the substrate 31 is too large, the air flow resistance of the suction fixing sheet 1 may be increased and it may be difficult to maintain the above-described ratio d2/d1 unless the thickness of the porous sheet 1 is made too large.

The pressure-sensitive adhesive (pressure-sensitive adhesive composition) contained in at least one selected from the pressure-sensitive adhesive layers 32a and 32b may be a crosslinked pressure-sensitive adhesive. The crosslinked pressure-sensitive adhesive has low flowability at high temperatures, and thus can more reliably suppress new occurrence of lifting and displacement of the suction fixing sheet once fixed to the suction surface. The pressure-sensitive adhesive contained in the pressure-sensitive adhesive layer 32a may be crosslinked pressure-sensitive adhesive. The pressure-sensitive adhesive contained in the pressure-sensitive adhesive layer 32b may be crosslinked pressure-sensitive adhesive. It is to be noted, however, that the pressure-sensitive adhesives contained in the pressure-sensitive adhesive layers 32a and/or 32b are not limited to crosslinked pressure-sensitive adhesives.

Examples of the crosslinked pressure-sensitive adhesive include various types of acrylic, urethane, silicone, and epoxy pressure-sensitive adhesives. Viewed from another aspect, the crosslinked pressure-sensitive adhesive is, for example, a crosslinkable pressure-sensitive adhesive or an ultraviolet-curable pressure-sensitive adhesive. The crosslinkable pressure-sensitive adhesive is a pressure-sensitive adhesive containing a crosslinking agent. Acrylic, urethane, and silicone pressure-sensitive adhesives are usually classified as crosslinkable pressure-sensitive adhesives. Among the pressure-sensitive adhesives given above as examples, acrylic and/or silicone pressure-sensitive adhesives are preferable because of their particularly low flowability at high temperatures. It is to be noted, however, that the crosslinked pressure-sensitive adhesive is not limited to the above examples. Moreover, a known crosslinked pressure-sensitive adhesive may be used as the crosslinked pressure-sensitive adhesive. Whether the pressure-sensitive adhesive of interest is a crosslinked pressure-sensitive adhesive can be determined by dissolving the pressure-sensitive adhesive in a solvent (e.g., toluene at 25° C.) that dissolves the pressure-sensitive adhesive and checking whether there is a component that remains undissolved (gel content). A gel content that remains undissolved is usually not observed in the case of hot-melt pressure-sensitive adhesives. Thus, the hot-melt pressure-sensitive adhesives do not correspond to crosslinked pressure-sensitive adhesives.

An acrylic pressure-sensitive adhesive is an adhesive containing an acrylic polymer as a base polymer. The acrylic pressure-sensitive adhesive may be a known acrylic pressure-sensitive adhesive. Examples of the acrylic pressure-sensitive adhesive include those disclosed in JP 2005-105212 A.

A silicone pressure-sensitive adhesive is an adhesive containing a silicone polymer as a base polymer. The silicone pressure-sensitive adhesive may be a known silicone pressure-sensitive adhesive. Examples of the silicone pressure-sensitive adhesive include those disclosed in JP 2003-313516 (including those disclosed in the comparative examples).

The pressure-sensitive adhesive layer 32a formed on one surface of the substrate 31 and the pressure-sensitive adhesive layer 32b formed on the other surface of the substrate 31 may have the same structure or may have structures different from each other. In one example of the double-sided adhesive sheet 3, the pressure-sensitive adhesive layers 32a and 32b are both formed of an acrylic pressure-sensitive adhesive. In another example of the double-sided adhesive sheet 3, one pressure-sensitive adhesive layer 32a is formed of a silicone pressure-sensitive adhesive and the other pressure-sensitive adhesive layer 32b is formed of an acrylic pressure-sensitive adhesive.

The suction surface of the suction device is usually made of a metal such as stainless steel. Comparing a pressure-sensitive adhesive layer formed of an acrylic pressure-sensitive adhesive and a pressure-sensitive adhesive layer formed of a silicone pressure-sensitive adhesive, the pressure-sensitive adhesive layer formed of a silicone pressure-sensitive adhesive can reduce the amount of pressure-sensitive adhesive residue (the residual amount of the pressure-sensitive adhesive forming the pressure-sensitive adhesive layer) on the suction surface. The suction fixing sheet 1 fixed to the suction surface is usually replaced after a suction holding step has been performed a predetermined number of times or when the wear amount of the surface of the porous sheet 2 to be in contact with a suction target has reached a predetermined value. At this time, if there is a pressure-sensitive adhesive residue on the suction surface, the surface of a newly disposed suction fixing sheet 1 may be uneven owing to the presence of a pressure-sensitive adhesive remaining on the suction surface, and this may cause unintended deformation of a suction target to be subsequently suction-held or surface damage to the suction target. On this account, it is desirable to reduce the amount of pressure-sensitive adhesive residue at the time of replacing the suction fixing sheet 1 as much as possible. Also, when the porous sheet 2 is a nonwoven fabric or a sintered sheet of resin particles, acrylic pressure-sensitive adhesives exhibit higher adhesive strength to the porous sheet 2 than silicone pressure-sensitive adhesives. Taking them into account, the suction fixing sheet 1 may be configured such that the one pressure-sensitive adhesive layer 32a is formed using a silicone pressure-sensitive adhesive, the other pressure-sensitive adhesive layer 32b is formed using an acrylic pressure-sensitive adhesive, and the pressure-sensitive adhesive layer 32b is in contact with the porous sheet 2, and the sheet 1 may be fixed to the suction device in such a manner that the pressure-sensitive adhesive layer 32a is in contact with the suction surface. This configuration can more reliably suppress new occurrence of lifting and displacement of the suction fixing sheet once fixed to the suction surface under high temperature conditions, and also can reduce the amount of pressure-sensitive adhesive residue on the suction surface at the time of replacing the suction fixing sheet 1.

The gel fraction of the crosslinked pressure-sensitive adhesive is, for example, 1% to 90%, and may be 2% to 80% or 5% to 60%. When the gel fraction falls within these ranges, the crosslinked pressure-sensitive adhesive can exhibit still lower flowability at high temperatures. The gel fraction of the pressure-sensitive adhesive can be evaluated as follows, for example.

Gel Fraction of Acrylic Pressure-Sensitive Adhesive

About 0.1 g of a pressure-sensitive adhesive layer to be evaluated is collected. The collected pressure-sensitive adhesive layer is wrapped with a polytetrafluoroethylene (PTFE) porous film having an average pore diameter of 0.2 (e.g., NTF 1122 manufactured by Nitto Denko Corporation). Thereafter, they were bound together with a kite string to prepare an evaluation sample. The weight of the evaluation sample (the weight c before immersion) is measured. The weight before immersion corresponds to the total weight of the collected pressure-sensitive adhesive, the PTFE porous film, and the kite string. Also, the sum of the weights of the PTFE porous film and the kite string used to prepare the evaluation sample is determined beforehand, and this is defined as the wrapper weight b.

The evaluation sample is then placed in a 50 mL container filled with ethyl acetate and allowed to stand still at 23° C. for 7 days. Thereafter, the evaluation sample is taken out from the container, placed in an aluminum cup, and dried in a dryer set at 130° C. for 2 hours to remove the ethyl acetate. Next, the weight of the evaluation sample is measured, and this weight is defined as the weight a after immersion.

The gel fraction can be determined from the thus-measured weight a after immersion, wrapper weight b, and weight c before immersion as per the following equation.

$$\text{Gel fraction (wt \%)} = (a-b)/(c-b) \times 100 \qquad \text{Equation:}$$

Gel Fraction of Silicone Pressure-Sensitive Adhesive

An evaluation sample in a size of about 19 mm×about 250 mm is prepared by forming a silicone pressure-sensitive adhesive layer to be evaluated on a surface of a substrate sheet. As the substrate sheet, a sheet made of a material that does not swell in toluene is selected. The substrate sheet is a PTFE sheet, for example. Then, the weight (weight C before immersion) of the evaluation sample is measured.

Next, the evaluation sample is immersed in about 300 mL of toluene at ordinary temperature for 48 hours. Thereafter, the evaluation sample is taken out from the toluene and air-dried for 30 minutes. Then, the evaluation sample is dried in a dryer set at 120° C. for 2 hours to remove the toluene. Subsequently, the evaluation sample is placed at room temperature and left to stand for 30 minutes. Thereafter, the weight A of the evaluation sample after immersion is measured. Then, the pressure-sensitive adhesive layer is removed from the substrate sheet, and the weight B of the substrate sheet is measured.

The gel fraction can be determined from the thus-measured weight A after immersion, weight B of the substrate sheet, and weight C before immersion as per the following equation.

$$\text{Gel fraction (wt \%)} = (A-B)/(C-B) \times 100 \qquad \text{Equation:}$$

The thickness of each of the pressure-sensitive adhesive layers 32a and 32b is, for example, 0.005 mm to 1.0 mm, and may be 0.01 mm to 0.5 mm.

In the example shown in FIGS. 1 and 3, the direction in which the through holes 4 extend is the direction perpendicular to the surfaces of the double-sided adhesive sheet 3. In this example, the through holes 4 extend linearly. Furthermore, in this example, the shape of the cross section of each through hole 4 (the cross section perpendicular to the direction in which it extends) is uniform from one surface to the other surface of the double-sided adhesive sheet 3. It is to be noted that the structure of the through holes 4, including the direction in which they extend, the state in which they extend, and the shape of their cross sections, is not limited as long as the double-sided adhesive sheet 3 has air permeability in its thickness direction. The through holes 4 having the uniform cross-sectional shape encompass those with nonuniformity in cross-sectional shape inevitable in the process of forming the through holes 4.

The shape of the opening of each through hole 4 is, for example, circular, oval, or rectangular, preferably circular or oval, and more preferably circular. It is to be noted, however, that the shape of the opening of each through hole 4 is not limited to the above examples.

The opening area of each through hole 4 is, for example, 10 mm$^2$ or less, and may be 7 mm$^2$ or less or even 5 mm$^2$ or less. The lower limit of the opening area of each through hole 4 is, for example, 0.1 mm$^2$ or more, and may be 0.3 mm$^2$ or more or even 0.5 mm$^2$ or more. When the opening area of each through hole 4 falls within these ranges, the degree to which the shape of the openings of the through holes 4 is transferred to a suction target during suction holding can be further reduced. However, if the opening area of each through hole 4 is too small, it may be difficult to ensure the air permeability of the suction fixing sheet 1 in the thickness direction.

The percent open area of the through holes 4 in the double-sided adhesive sheet 3 (the ratio of the total of the opening areas of the through holes 4 on a surface of the double-sided adhesive sheet 3 to the area of the surface) may be, for example, 15.0% or more, and may be 20.0% or more, 25.0% or more, 30.0% or more, or even 35.0% or more. The upper limit of the percent open area of the through holes 4 is, for example, 60.0% or less, and may be 55.0% or less or even 50.0% or less. When the percent open area of the through holes 4 falls within these ranges, the air permeability in the thickness direction of the suction fixing sheet 1 can be ensured more reliably. It is preferable that the percent open area of the through holes 4 in the double-sided adhesive sheet 3 falls within these ranges at least in a region to be in contact with a suction target during suction holding of the suction target.

When the percent open area of the through holes 4 in the adhesive sheet 3 and the opening area of each through hole 4 fall within the above-described ranges, it is possible to further reduce the degree to which the shape of the openings of the through holes 4 is transferred to the suction target during suction holding while more reliably ensuring the air permeability of the suction fixing sheet 1 in the thickness direction.

Figure 4:
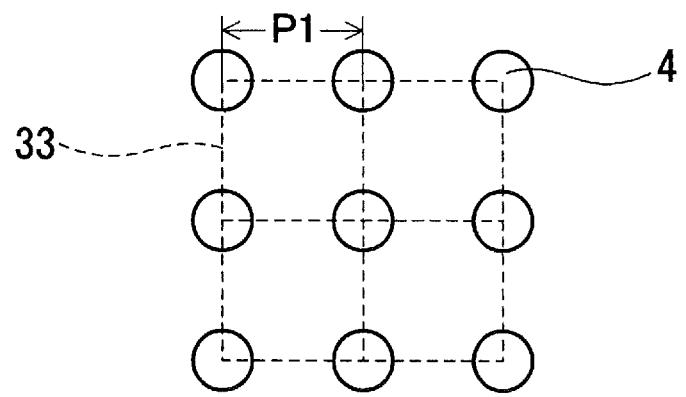
FIG. 4 is a plan view schematically showing an example of the arrangement of through holes in the double-sided pressure-sensitive adhesive sheet that may be included in the suction fixing sheet of the present invention.
Figure 5:
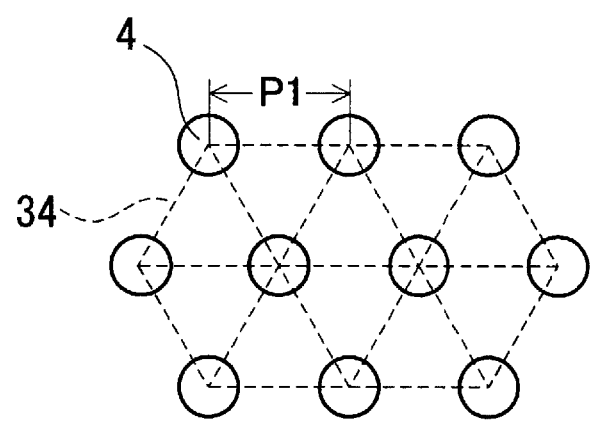
FIG. 5 is a plan view schematically showing another example of the arrangement of the through holes in the double-sided pressure-sensitive adhesive sheet that may be included in the suction fixing sheet of the present invention.

Examples of the arrangement of the through holes 4 in the double-sided adhesive sheet 3 are shown in FIGS. 4 and 5. FIGS. 4 and 5 show openings of the through holes 4 on a surface of the double-sided adhesive sheet 3. It is to be noted, however, that the arrangement of the through holes 4 on the double-sided adhesive sheet 3 is not limited to the examples shown in FIGS. 4 and 5.

In the example shown in FIG. 4, the through holes 4 are arranged such that, when viewed in a direction perpendicular to the surfaces of the double-sided adhesive sheet 3, the centers of the openings of the respective through holes 4 are at the respective intersections (lattice points) of a virtual square lattice 33 on the surface. In the example shown in FIG. 5, the through holes 4 are arranged such that, when viewed in a direction perpendicular to the surfaces of the double-sided adhesive sheet 3, the centers of the openings of the respective through holes 4 are at respective intersections of a virtual equilateral triangular lattice 34 on the surface. The double-sided adhesive sheet 3 may have these arrangements of the through holes at least in a region to be in contact with a suction target during suction holding of the suction target. According to the arrangements of the through holes 4 shown in these examples, it is possible to obtain the suction fixing sheet 1 having more uniform air permeability in the thickness direction over the entire sheet or at least over the entire above-described region. When the air permeability of the suction fixing sheet 1 in the thickness direction is more uniform, a suction target can be suction-held more evenly, and unintended deformation of the suction target or surface damage to the suction target during suction holding can be suppressed more reliably. In the examples shown in FIGS. 4 and 5, the openings and cross sections of the respective through holes 4 are all in the same shape, and more specifically, they are in a circular shape. It is to be noted, however, that the openings and/or cross sections of the respective through holes 4 need not be all in the same shape. Further, in the examples shown in FIGS. 4 and 5, the centers of the respective through holes 4 need not be exactly at the respective intersections of the square lattice 33 or the equilateral triangular lattice 34. For example, displacement of the center positions inevitable in the process of providing the through holes 4 is allowed.

In the examples shown in FIGS. 4 and 5, the center-to-center distance (pitch) P1 of through holes 4 in closest proximity to each other is, for example, 0.5 mm to 10.0 mm, and may be 1.0 mm to 5.0 mm.

The thickness of the suction fixing sheet 1 is, for example, 0.065 mm to 6 mm, and may be 0.1 mm to 3.5 mm or 0.25 mm to 1.0 mm.

The air permeability of the suction fixing sheet 1 in the thickness direction as expressed in terms of Frazier number is, for example, 0.1 cm$^3$/(cm$^2$·sec) or more, and may be 0.3 cm$^3$/(cm$^2$·sec) or more, 0.5 cm$^3$/(cm$^2$·sec) or more, 0.7 cm$^3$/(cm$^2$·sec) or more, 0.9 cm$^3$/(cm$^2$·sec) or more, 1.2 cm$^3$/(cm$^2$·sec) or more, or even 1.5 cm$^3$/(cm$^2$·sec) or more. The upper limit of the air permeability as expressed in terms of Frazier number is, for example, 10 cm$^3$/(cm$^2$·sec) or less.

The shape of the suction fixing sheet 1 is, for example, a polygonal shape including a square shape and a rectangle shape or a strip shape. It is to be noted, however, that the shape of the suction fixing sheet 1 is not limited to the above examples. The suction fixing sheet 1 is unlikely to cause unintended deformation of a suction target or surface damage to the suction target even when the area of the suction fixing sheet 1 is large.

The area of the suction fixing sheet 1 may be, for example, 50 cm$^2$ or more, 100 cm$^2$ or more, 225 cm$^2$ or more, 400 cm$^2$ or more, 1000 cm$^2$ or more, or even 10000 cm$^2$ or more.

The suction fixing sheet 1 may further include a member other than the porous sheet 2 and the double-sided adhesive sheet 3 as long as the effects of the present invention can be obtained. The member is, for example, a separator disposed on the pressure-sensitive adhesive layer 32a or 32b as an exposed surface. The separator can be disposed on the suction fixing sheet 1 when distributing the sheet 1 into the market, and the separator can be peeled off from the laminate of the porous sheet 2 and the double-sided adhesive sheet 3 when using the sheet 1 (when fixing the sheet 1 to a suction surface of a suction device). The suction fixing sheet 1 may include the porous sheet 2 and the double-sided adhesive sheet 3 at least in a region to be in contact with a suction target during suction holding of the suction target.

The suction fixing sheet 1 of the first embodiment can be formed by, for example, disposing the double-sided adhesive sheet 3 on one surface of the porous sheet 2 with the pressure-sensitive adhesive layer 32a or 32b interposed therebetween. When the pressure-sensitive adhesive layers 32a and 32b have different constitutions, the double-sided adhesive sheet 3 may be disposed on the porous sheet 2 with the one having a larger adhesive strength interposed therebetween. In this case, the suction fixing sheet 1 is fixed to a suction surface of a suction device with the pressure-sensitive adhesive layer having a smaller adhesive strength interposed therebetween. This allows the suction fixing sheet 1 to be replaced more easily. It is to be noted, however, that the method for forming the suction fixing sheet 1 is not limited to the above example.

The double-sided adhesive sheet 3 can be formed by, for example, processing the laminate of the pressure-sensitive adhesive layer 32a, the substrate 31, and the pressure-sensitive adhesive layer 32b so as to have a plurality of through holes 4. It is to be noted, however, that the method for forming the double-sided adhesive sheet 3 is not limited to this example. The processing for forming the plurality of through holes 4 can be performed using various perforation methods such as punching, die-cutting with a Thomson blade, and laser irradiation. The laminate of the pressure-sensitive adhesive layers 32a and 32b and the substrate 31 can be formed by, for example, applying a pressure-sensitive adhesive composition(s) to surfaces of the substrate 31 and then drying and/or hardening the coating formed by applying the composition(s).

The suction target may be, for example, a self-supporting sheet such as a metal sheet or a glass sheet, or a non-self-supporting thin sheet-like body such as a metal foil, a plastic film, or a ceramic green sheet. It is to be noted, however, that the suction target is not limited to the above examples. The non-self-supporting thin sheet-like body is more susceptible to unintended deformation or surface damage when it is suction-held on a suction surface. However, even when such a sheet-like body is suction-held, the occurrence of the deformation of the sheet-like body or surface damage to the sheet-like body also can be suppressed by using the suction fixing sheet 1.

Second Embodiment

Figure 6A:
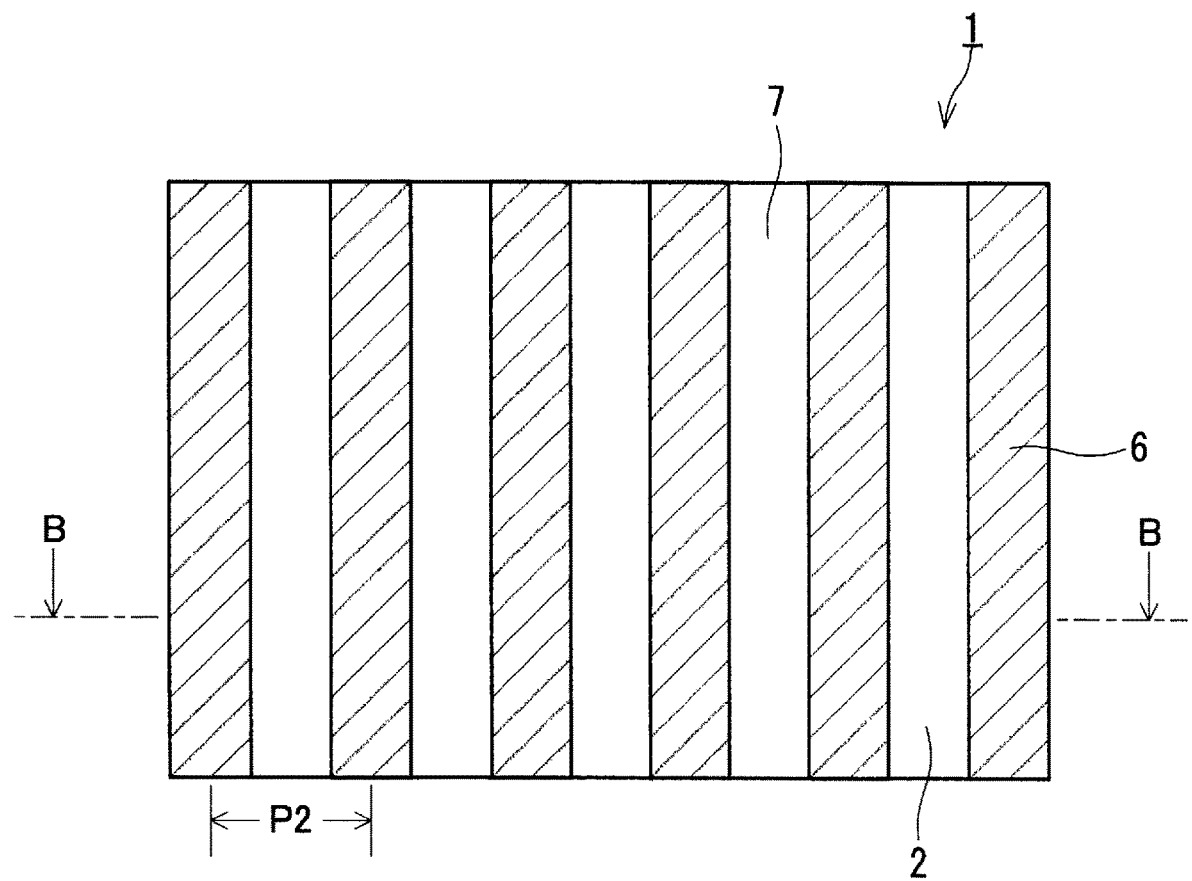
FIG. 6A is a plan view schematically showing another example of the suction fixing sheet of the present invention.
Figure 6B:
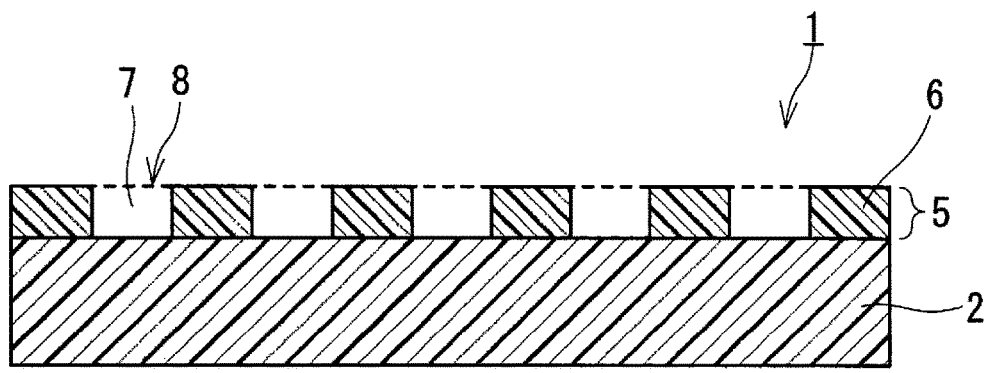
FIG. 6B is a schematic view showing the cross section of the suction fixing sheet taken along line B-B in FIG. 6A.

FIG. 6A shows an example of a suction fixing sheet 1 according to a second embodiment. FIG. 6B shows a cross section of the suction fixing sheet 1 taken along line B-B in FIG. 6A. The suction fixing sheet 1 shown in FIGS. 6A and 6B includes a porous sheet 2 having air permeability in its thickness direction and a double-sided pressure-sensitive adhesive layer (hereinafter, referred as "double-sided adhesive layer") 5 having air permeability in its thickness direction. The double-sided adhesive layer 5 is disposed on one surface of the porous sheet 2. The double-sided adhesive layer 5 is formed of a crosslinked pressure-sensitive adhesive 6. More specifically, the double-sided adhesive layer 5 is a layer formed of a plurality of pieces of the pressure-sensitive adhesive 6 disposed on the one surface of the porous sheet 2. The pieces of the pressure-sensitive adhesive 6 are disposed spaced apart from each other on the one surface of the porous sheet 2. The ratio d2/d1 of the thickness d2 of the porous sheet 2 to the thickness d1 of the double-sided adhesive layer 5 is 8.0 or more. In the suction fixing sheet 1 of the second embodiment, air permeability in its thickness direction is imparted by the porous sheet 2 and spaces 7 between adjacent pieces of the pressure-sensitive adhesive 6 in the double-sided adhesive layer 5. Thus, the suction fixing sheet 1 can be used as a suction fixing sheet to be placed on a suction surface of a suction device to prevent contact between a suction target and the suction surface. The suction fixing sheet 1 of the second embodiment is placed and fixed on a suction surface of a suction device in such a manner that the double-sided adhesive layer 5 is in contact with the suction surface.

In the second embodiment, the ratio d2/d1 may be 10.0 or more, 14.0 or more, 20.0 or more, 25.0 or more, 30.0 or more, 35.0 or more, or even 40.0 or more, because the degree to which the shape of openings 8 of the spaces 7 in the adhesive layer 5 is transferred to a suction target by the suction force during suction holding can be suppressed more reliably as the thickness of the porous sheet 2 becomes relatively larger. The upper limit of the ratio d2/d1 is, for example, 60.0 or less.

In the example shown in FIGS. 6A and 6B, on the one surface of the porous sheet 2, the plurality of pieces of the pressure-sensitive adhesive 6 are disposed spaced apart from each other, thereby forming the double-sided adhesive layer 5. More specifically, when viewed in a direction perpendicular to the one surface of the porous sheet 2, the pieces of the pressure-sensitive adhesive 6 are arranged in stripes on the one surface. It is to be noted, however, that the arrangement (arrangement pattern) of the pieces of the pressure-sensitive adhesive 6 in the double-sided adhesive layer 5 is not limited to the example shown in FIGS. 6A and 6B, as long as the double-sided adhesive layer 5 has the spaces 7 that impart the air permeability in the thickness direction to the double-sided adhesive layer 5.

The pieces of the pressure-sensitive adhesive 6 are preferably disposed on the one surface of the porous sheet 2 at least in a region to be in contact with a suction target during suction holding of the suction target, and more preferably disposed on the one surface of the porous sheet 2 over the entire above-described region.

The crosslinked pressure-sensitive adhesives given above as examples in the description regarding the double-sided adhesive sheet 3 can be used as the pressure-sensitive adhesive 6.

The thickness of each pieces of the pressure-sensitive adhesive 6 is, for example, 1 to 300 µm, and may be 5 to 100 µm. When the thickness of each piece of the pressure-sensitive adhesive 6 falls within these ranges, the above-described effects can be obtained more reliably.

The area of each piece of the pressure-sensitive adhesive 6 when viewed in the direction perpendicular to the one surface of the porous sheet 2 is, for example, 0.05 to 1 mm$^2$, and may be 0.1 to 0.5 mm$^2$. It is to be noted, however, that, when the pieces of the pressure-sensitive adhesive 6 are arranged in stripes as shown in FIGS. 6A and 6B, the area of each piece is determined by the width×the length thereof and may exceed the above-described ranges.

The width of each of the pieces of the pressure-sensitive adhesive 6 arranged in stripes as shown in FIGS. 6A and 6B is, for example, 0.1 to 5 mm, and may be 0.5 to 2 mm.

The percentage of occupation of the pressure-sensitive adhesive 6 on the one surface of the porous sheet 2 (when viewed in the direction perpendicular to the one surface of the porous sheet 2, the ratio of the total of the areas of the pieces of the pressure-sensitive adhesive 6 disposed on the one surface to the area of the one surface) is, for example, 30% to 90%, and may be 40% to 60%. Preferably, the percentage of occupation falls within these ranges at least in a region to be in contact with a suction target during suction holding of the suction target.

When viewed in the direction perpendicular to the one surface of the porous sheet 2, the pieces of the pressure-sensitive adhesive 6 may be disposed on the one surface at regular intervals. In this case, the arrangement interval of the pieces of the pressure-sensitive adhesive 6 is, for example, 0.5 to 10 mm, and may be 1 to 5 mm. The arrangement interval of the pieces of the pressure-sensitive adhesive 6 is usually the center-to-center distance between the pieces of the pressure-sensitive adhesive 6 in closest proximity to each other. In the case where the pieces of the pressure-sensitive adhesive 6 are arranged in stripes as shown in FIGS. 6A and 6B, the arrangement interval is the centerline-to-centerline distance (pitch) P2 between adjacent pieces of the pressure-sensitive adhesive 6. The pieces of the pressure-sensitive adhesive 6 may be disposed at regular intervals on the one surface at least in a region to be in contact with a suction target during suction holding of the suction target by a suction device.

When viewed in the direction perpendicular to the one surface of the porous sheet 2, the pieces of the pressure-sensitive adhesive 6 may have the same shape. Further, at least in the region to be in contact with the suction target during suction holding of the suction target by the suction device, the pieces of the pressure-sensitive adhesive 6 may have the same shape when viewed in the direction perpendicular to the one surface of the porous sheet 2.

The above descriptions regarding the porous sheet 2 in the suction fixing sheet 1 of the first embodiment, including those regarding the preferred modes thereof, also apply to the porous sheet 2 in the suction fixing sheet 1 of the second embodiment.

The suction fixing sheet 1 of the second embodiment may have the same properties and/or shape as the suction fixing sheet 1 of the first embodiment. The properties are, for example, the thickness, the area, and the air permeability in the thickness direction. The suction fixing sheet 1 of the second embodiment may further include a member other than the porous sheet 2 and the double-sided adhesive layer 5 as long as the effects of the present invention can be obtained. The member is, for example, the separator described above in the description regarding the suction fixing sheet 1 of the first embodiment.

The suction fixing sheet 1 of the second embodiment can be formed by, for example, disposing pieces of the pressure-sensitive adhesive 6 in a predetermined pattern on one surface of the porous sheet 2. The suction fixing sheet 1 may be formed by disposing pieces of the pressure-sensitive adhesive 6 in a predetermined pattern on a surface of a transfer sheet and then transferring the thus-arranged pieces of the pressure-sensitive adhesive 6 to one surface of the porous sheet 2. The pieces of the pressure-sensitive adhesive 6 can be disposed in a predetermined arrangement pattern using, for example, a known applicator that can dispose the pieces of the pressure-sensitive adhesive 6 according to the pattern, such as, e.g., a slot die provided with a shim plate. Also, by using a slot die provided with a comb-type shim plate, the pieces of the pressure-sensitive adhesive 6 can be disposed in stripes on one surface of the porous sheet 2. It is to be noted, however, that the method for forming the suction fixing sheet 1 is not limited to the above example.

The suction fixing sheet of the present invention is not limited to the above-described suction fixing sheets of the first and second embodiments. For example, the above-described double-sided adhesive sheet (1) may have any structure as long as it is provided with a substrate and has air permeability in its thickness direction. Also, the above-described double-sided adhesive layer (2) may have any structure as long as it is formed of a crosslinked pressure-sensitive adhesive and has air permeability in its thickness direction. The suction fixing sheet of the present invention may be a suction fixing sheet to be placed on a suction surface of a suction device to prevent contact between a suction target and the suction surface, including a porous sheet having air permeability and a double-sided adhesive sheet provided with a plurality of through holes and bonded to one surface of the porous sheet, and the ratio of the thickness of the porous sheet to the thickness of the double-sided adhesive sheet is 8.0 or more.

[Suction Holding of Suction Target Using Suction Fixing Sheet]

Figure 7:
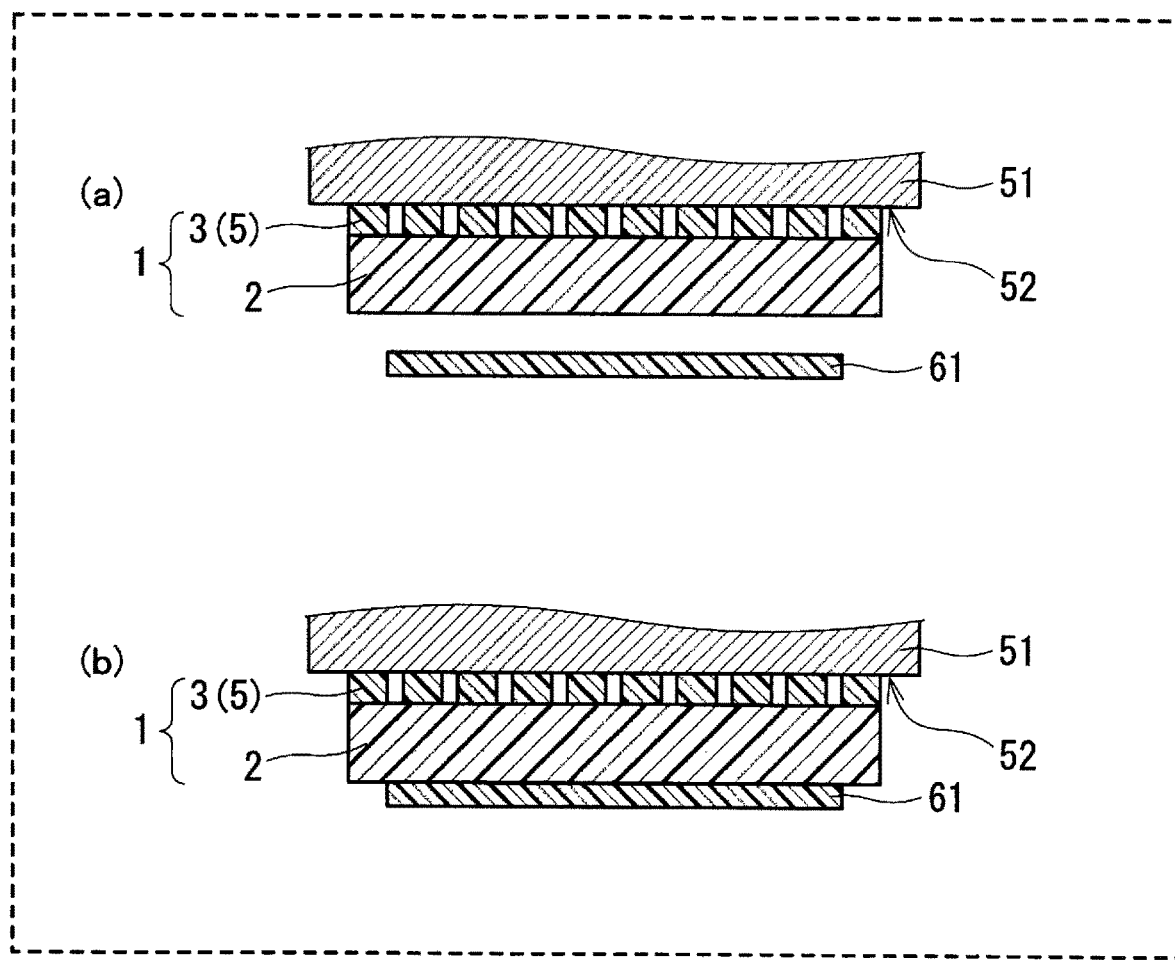
FIG. 7 is a cross-sectional view schematically illustrating a step of suction-holding a suction target onto a suction surface of a suction device with the use of the suction fixing sheet of the present invention.

FIG. 7 illustrates a step of suction-holding a suction target using a suction device with the suction fixing sheet 1 being fixed to a suction surface thereof. As shown in (a), the suction fixing sheet 1 is fixed to a suction surface 52 of a suction unit 51 of the suction device using the double-sided adhesive sheet 3 or the double-sided adhesive layer 5. Then, as shown in (b), by generating a suction force in the suction unit 51, a suction target 61 is suction-held with the suction fixing sheet 1 interposed therebetween.

As the suction device and the suction unit 51, any known device and unit can be used, respectively. The suction surface 52 of the suction unit 51 is usually a metal surface.

The suction target can be subjected to any processing in a state of being fixed to the suction surface. The processing may be press processing, for example. In press processing, suction pressing can be performed in which a suction target subjected to pressing in a state of being fixed to the suction surface.

EXAMPLES

Hereinafter, the present invention will be described in more detail with reference to examples. The present invention is not limited to the following examples.

Example 1

As a porous sheet, a sintered sheet of UHMWPE particles (Nitto Denko Corporation, SUNMAP, thickness: 1.0 mm, size: 200 mm×200 mm) was prepared. The air permeability of the thus-prepared porous sheet in its thickness direction was 2.0 $cm^3/(cm^2 \cdot sec)$ as expressed in terms of Frazier number. In addition to the above-described porous sheet, as a double-sided adhesive sheet, a sheet (Nitto Denko Corporation, No. 5302A, thickness: 85 µm, size: 200 mm×200 mm) including a PET substrate (thickness: 23 µm), an acrylic pressure-sensitive adhesive layer (thickness: 31 µm) formed on one surface of the substrate, and a silicone pressure-sensitive adhesive layer (thickness: 31 µm) formed on the other surface of the substrate was prepared. The acrylic pressure-sensitive adhesive layer had a gel fraction of 25% and the silicone pressure-sensitive adhesive layer had a gel fraction of 10% according to the evaluation using the above-described methods. Next, the prepared double-sided adhesive sheet was subjected to pressing using a die to form a plurality of through holes passing through the sheet in a direction perpendicular to the surfaces thereof. The cross section and the opening of each through hole were in a circular shape. In other words, each of the thus-formed through holes had a columnar shape. The through holes were formed over the entire sheet in such a manner that, as shown in FIG. 5, the respective through holes were at respective intersections of a virtual equilateral triangular lattice when viewed in a direction perpendicular to the surfaces of the sheet. The diameter (opening diameter) of each of the thus-formed through holes was set to 2.0 mm, and the center-to-center distance (pitch) P1 of the through holes in closest proximity to each other was set to 3.0 mm. The percent open area of the double-sided adhesive sheet was 40.3%. The thickness of the prepared porous sheet, the thicknesses of the substrate and the pressure-sensitive adhesive layers of the double-sided adhesive sheet, and the thickness of the double-sided adhesive sheet were evaluated either using a micrometer (Mitutoyo Corporation) or through analysis of a cross-sectional microscopic image.

Next, the prepared porous sheet and double-sided adhesive sheet were bonded together in such a manner that the acrylic pressure-sensitive adhesive layer in the double-sided adhesive sheet was in contact with the porous sheet and the outer peripheries of both the sheets were aligned with each other. Thus, a suction fixing sheet of Example 1 was obtained. In the thus-obtained suction fixing sheet, the ratio d1/d2 of the thickness of the porous sheet to the thickness of the double-sided adhesive sheet was 11.8.

Example 2

A suction fixing sheet of Example 2 was obtained in the same manner as in Example 1, except that the thickness of a porous sheet was changed to 0.45 mm and that a sheet (thickness: 40 μm, size: 200 mm×200 mm) including a PET substrate (thickness: 12 μm), an acrylic pressure-sensitive adhesive layer (thickness: 14 μm) formed on one surface of the substrate, and a silicone pressure-sensitive adhesive layer (thickness: 14 μm) formed on the other surface was used as a double-sided adhesive sheet. The air permeability of the prepared porous sheet in the thickness direction was 3.0 cm$^3$/(cm$^2$·sec) as expressed in terms of Frazier number. In the thus-obtained suction fixing sheet, the ratio d1/d2 of the thickness of the porous sheet to the thickness of the double-sided adhesive sheet was 11.3. The acrylic pressure-sensitive adhesive layer had a gel fraction of 10% and the silicone pressure-sensitive adhesive layer had a gel fraction of 35% according to the evaluation using the above-described methods. The double-sided adhesive sheet was produced in the following manner.

100 parts by weight of a mixture of n-butyl acrylate and acrylic acid=100:5 (weight ratio) was dissolved in toluene used as a polymerization solvent. Thereafter, 0.2 parts by weight of benzoyl peroxide as a polymerization initiator was added to the mixture to cause the polymerization of the mixture to proceed. As a result, a solution of an acrylic copolymer having a weight-average molecular weight of 500,000 was obtained. Subsequently, 20 parts by weight of a rosin phenolic resin, 20 parts by weight of a rosin resin, and 2.8 parts by weight of an isocyanate crosslinking agent were added with respect to 100 parts by weight of the copolymer as a solid content. They were mixed together to prepare an acrylic pressure-sensitive adhesive composition (solution). Next, the thus-prepared pressure-sensitive adhesive composition was applied onto a release liner that had been subjected to a treatment with a polydimethylsiloxane release agent to form a coating of the pressure-sensitive adhesive composition having a dry thickness of 14 μm. The coating was dried at 100° C. for 3 minutes to form an acrylic pressure-sensitive adhesive layer.

Meanwhile, 100 parts by weight of polydimethylsiloxane having hydroxy groups at both ends and having a polarization degree of 4000 and 100 parts by weight of a hydroxy group-containing branched polymethylsiloxane having a composition ratio of 0.8 parts by mole of M units ((CH$_3$)$_3$SiO$_{1/2}$) to 1 part by mole of Q units (SiO$_2$) were partially condensed in toluene in the presence of sodium hydroxide. Thereafter, the solution containing the partial condensate was neutralized with phosphoric acid to prepare a toluene solution containing the precursor of the silicone pressure-sensitive adhesive.

Next, 1 part by weight of benzoyl peroxide as a curing agent with respect to 100 parts by weight of the solid content of the precursor was added to the thus-prepared toluene solution to obtain a silicone pressure-sensitive adhesive solution. Subsequently, the solution was applied to one side of the 12 μm-thick PET film as the substrate to form a coating having a dry thickness of 14 μm, and the coating was dried at 140° C. for 3 minutes to form a silicone pressure-sensitive adhesive layer. Thereafter, a release liner that had been subjected to a treatment with a polydimethylsiloxane release agent was bonded to the silicone pressure-sensitive adhesive layer to obtain a single-sided pressure-sensitive adhesive sheet. Then, the acrylic pressure-sensitive adhesive layer formed in the above was bonded to the exposed surface of the PET substrate of the obtained single-sided pressure-sensitive adhesive sheet. In this manner, a double-sided adhesive sheet used in Example 2 was obtained.

Example 3

A suction fixing sheet of Example 3 was obtained in the same manner as in Example 1, except that the thickness of a porous sheet was changed to 0.30 mm and that a sheet (Nitto Denko Corporation, No. 5603, thickness: 30 μm, size: 200 mm×200 mm) including a PET substrate (thickness: 12 μm) and acrylic pressure-sensitive adhesive layers (each having a thickness of 9 μm) formed on both surfaces of the PET substrate was used as a double-sided adhesive sheet. The air permeability of the prepared porous sheet in the thickness direction was 4.0 cm$^3$/(cm$^2$·sec) as expressed in terms of Frazier number. In the thus-obtained suction fixing sheet, the ratio d1/d2 of the thickness of the porous sheet to the thickness of the double-sided adhesive sheet was 10.0. The acrylic pressure-sensitive adhesive layers each had a gel fraction of 9% according to the evaluation using the above-described method.

Example 4

A suction fixing sheet of Example 4 was obtained in the same manner as in Example 1, except that the thickness of a porous sheet was changed to 0.70 mm. The air permeability of the thus-prepared porous sheet in the thickness direction was 2.0 cm$^3$/(cm$^2$·sec) as expressed in terms of Frazier number. In the thus-obtained suction fixing sheet, the ratio d1/d2 of the thickness of the porous sheet to the thickness of the double-sided adhesive sheet was 8.2.

Comparative Example 1

A suction fixing sheet of Comparative Example 1 was obtained in the same manner as in Example 2, except that the thickness of a porous sheet was changed to 0.30 mm. The air permeability of the prepared porous sheet in the thickness direction was 4.0 cm$^3$/(cm$^2$·sec) as expressed in terms of Frazier number. In the thus-obtained suction fixing sheet, the ratio d1/d2 of the thickness of the porous sheet to the thickness of the double-sided adhesive sheet was 7.5.

Comparative Example 2

A suction fixing sheet of Comparative Example 2 was obtained in the same manner as in Example 1, except that the thickness of a porous sheet was changed to 0.30 mm. The air permeability of the prepared porous sheet in the thickness direction was 4.0 cm$^3$/(cm$^2$·sec) as expressed in terms of Frazier number. In the thus-obtained suction fixing sheet, the ratio d1/d2 of the thickness of the porous sheet to the thickness of the double-sided adhesive sheet was 3.5.

Example 5

A suction fixing sheet of Example 5 was obtained in the same manner as in Example 1, except that the diameter (opening diameter) of each through hole formed in a double-sided adhesive sheet was changed to 0.8 mm, and the center-to-center distance (pitch) P1 of the through holes in closest proximity to each other was changed to 1.8 mm. The thus-obtained suction fixing sheet had a percent open area of 17.9%. In the thus-obtained suction fixing sheet, the ratio d1/d2 of the thickness of the porous sheet to the thickness of the double-sided adhesive sheet was 11.8.

Examples 6 to 8 and Comparative Examples 3 and 4

Suction fixing sheets of Examples 6 to 8 and Comparative Examples 3 and 4 were obtained in the same as in Examples 2 to 4 and Comparative Examples 1 and 2, respectively, except that, as a double-sided adhesive sheet, the double-sided adhesive sheet used in Example 5 was used. In the thus-obtained respective suction fixing sheets, the ratios d1/d2 of the thickness of the porous sheet to the thickness of the double-sided adhesive sheet were the same as those in the suction fixing sheets produced in Examples 2 to 4 and Comparative Examples 1 and 2, respectively (see Table 1).

Example 9

A suction fixing sheet of Example 9 was obtained in the same manner as in Example 1, except that the diameter (opening diameter) of each through hole formed in a double-sided adhesive sheet was changed to 1.5 mm and that the center-to-center distance (pitch) P1 of the through holes in closest proximity was changed to 2.5 mm. The thus-obtained suction fixing sheet had a percent open area of 32.6%. In the thus-obtained suction fixing sheet, the ratio d1/d2 of the thickness of the porous sheet to the thickness of the double-sided adhesive sheet was 11.8.

Examples 10 to 12 and Comparative Examples 5 and 6

Suction fixing sheets of Examples 10 to 12 and Comparative Examples 5 and 6 were obtained in the same as in Examples 2 to 4 and Comparative Examples 1 and 2, respectively, except that, as a double-sided adhesive sheet, the double-sided adhesive sheet used in Example 9 was used. In the thus-obtained respective suction fixing sheets, the ratios d1/d2 of the thickness of the porous sheet to the thickness of the double-sided adhesive sheet were the same as those in the suction fixing sheets produced in Examples 2 to 4 and Comparative Examples 1 and 2, respectively (see Table 1).

Example 13

As a porous sheet, a sintered sheet of UHMWPE particles (Nitto Denko Corporation, SUNMAP, thickness: 0.30 mm, size: 200 mm×200 mm) was prepared. The air permeability of the prepared porous sheet in the thickness direction was 4.0 cm$^3$/(cm$^2$·sec) as expressed in terms of Frazier number. Next, a double-sided adhesive layer unprovided with a substrate was formed by applying pieces of an acrylic pressure-sensitive adhesive in stripes over one entire surface of the prepared porous sheet. Thus, a suction fixing sheet was obtained. The thus-obtained suction fixing sheet was provided with the double-sided adhesive layer formed by arranging the pieces of the pressure-sensitive adhesive in stripes on the one surface of the porous sheet when viewed in a direction perpendicular to the one surface. The acrylic pressure-sensitive adhesive was applied using a slot die provided with a comb-type shim plate. The pieces of the acrylic pressure-sensitive adhesive forming the stripes each had a width of 1.0 mm and a thickness of 7 µm, and the pitch P2, which was the centerline-to-centerline distance between adjacent pieces of the acrylic pressure-sensitive adhesive, was 2.3 µm. The ratio (percentage of occupation) of the area of the pressure-sensitive adhesive to the area of the one surface of the porous sheet was 43.5%. The acrylic pressure-sensitive adhesive had a gel fraction of 30% according to the evaluation using the above-described method. The acrylic pressure-sensitive adhesive used was prepared as follows.

First, 95 parts by weight of 2-ethylhexyl acrylate, 5 parts by weight of acrylic acid, 0.2 parts by weight of benzoyl peroxide (BPO), which is an organic peroxide crosslinking agent, and 100 parts by weight of ethyl acetate were mixed together, and the resultant mixture was subjected to nitrogen gas purge for 2 hours. Subsequently, polymerization of the mixture was allowed to proceed at 60° C. for 6 hours in the nitrogen gas atmosphere. As a result, an acrylic polymer having a weight-average molecular weight of 800,000 was obtained. Next, 0.14 parts by weight of a trifunctional isocyanate compound (trade name: Coronate L, Tosoh Corporation) and 0.007 parts by weight of a polyfunctional epoxy resin (trade name: TETRAD-C, Mitsubishi Gas Chemical Company, Inc.) were added to 100 parts by weight of the solid content of the obtained acrylic polymer. In this manner, the above-described acrylic pressure-sensitive adhesive was prepared.

Example 14

A suction-fixing sheet provided with a double-sided adhesive layer formed by arranging pieces of a pressure-sensitive adhesive in stripes on one surface of a porous sheet when viewed in a direction perpendicular to the one surface of the porous sheet was obtained in the same manner as in Example 13, except that, by changing the shim plate, the width and the thickness of each of the pieces of the acrylic pressure-sensitive adhesive forming the stripes were set to 1.1 mm and 21 µm, respectively, and the pitch P2 was set to 2.7 µm. The ratio (percentage of occupation) of the area of the pressure-sensitive adhesive to the area of the one surface of the porous sheet was 41.5%.

Example 15

A suction-fixing sheet provided with a double-sided adhesive layer formed by arranging pieces of a pressure-sensitive adhesive in stripes on one surface of a porous sheet when viewed in a direction perpendicular to the one surface of the porous sheet was obtained in the same manner as in Example 13, except that, by changing the shim plate, the width and the thickness of each of the pieces of the acrylic pressure-sensitive adhesive forming the stripes were set to 1.9 mm and 31 μm, respectively, and the pitch P2 was set to 3.1 μm. The ratio (percentage of occupation) of the area of the pressure-sensitive adhesive to the area of the one surface of the porous sheet was 61.5%.

Regarding the suction fixing sheets (size: 200 mm×200 mm) prepared in the respective examples and comparative examples, the degree of change in shape (the height of protrusions) caused on the surface of a suction target during suction pressing and the air permeability in the thickness direction were evaluated as follows.

Degree of Change in Shape (Height of Protrusion) Caused on Surface of Suction Target During Suction Holding]

A polyimide film (Du Pont-Toray Co Ltd., 300V, thickness: 75 μm thick) as a suction target was suction-held with the suction fixing sheet (size: 200 mm×200 mm) prepared in each of the examples and comparative examples interposed therebetween. Scanning white light interferometry to be described below was used to confirm beforehand that the surface of the polyimide film was smooth and free of protrusions having a height of 0.3 μm or more.

The polyimide film as the suction target was subjected to suction pressing at 80° C. in a state of being suction-holed. Thereafter, the suction force was released and the suction target was taken out. The pressure used for the press processing was varied among 5 kN, 10 kN, and 50 kN per 200 mm×200 mm. In the suction fixing sheets produced in the examples, lifting or displacement was not caused by the press processing.

Next, using a three-dimensional optical profiler Zyge NewView 8000 (magnification of objective lens: 2.5×) manufactured by Canon Inc., the maximum height of protrusions formed, on the surface of the taken-out suction target that had been in contact with the suction fixing sheet, at positions corresponding to the openings of the through holes in the double-sided adhesive sheet (Examples 1 to 12 and Comparative Examples 1 to 6) or the openings of the spaces 7 in the double-sided adhesive layer (Examples 13 to 15) of the suction fixing sheet was evaluated according to scanning white light interferometry (vertical scanning low-coherence interferometry prescribed in ISO 25178). For the evaluation, in order to allow white light to be reliably reflected from the evaluation surface of the polyimide film, a platinum thin film was deposited on the surface. As deposition conditions, the current applied to platinum as the deposition source was set to 20 mA, and the deposition period was set to 60 seconds. The evaluation of the maximum height was performed for all the protrusions present in the entire region (200 mm×200 mm) of the suction target, and the average value of the maximum heights obtained for the respective protrusions was defined as the maximum height of the protrusions formed in the suction target. The evaluation was performed for each of the samples subjected to the different pressures during the press processing.

Air Permeability in Thickness Direction

The air permeability (Frazier number) in the thickness direction of the suction fixing sheet produced in each of the examples and comparative examples was measured according to Method A for air permeability measurement (Frazier method) prescribed in JIS L 1096: 2010. The air permeability (Frazier number) in the thickness direction of each of the prepared porous sheets was also measured according to this method.

The constitutions of the suction fixing sheets produced are shown in Table 1, and the results of the evaluation are shown in Table 2. In Table 2, regarding the maximum height of the protrusions, ○ (good) indicates that the maximum height of the protrusions was less than 0.5 μm, Δ (acceptable) indicates that the maximum height was 0.5 μm or more and less than 1.0 and × (poor) indicates that the maximum height was 1.0 μm or more. Also, in Table 2, regarding the air permeability in the thickness direction as expressed in terms of Frazier number, ⊚ (excellent) indicates that the air permeability was 1.0 cm$^3$/(cm$^2$·sec) or more, ○ (good) indicates that the air permeability was 0.3 cm$^3$/(cm$^2$·sec) or more and less than 1.0 cm$^3$/(cm$^2$·sec), and Δ (acceptable) indicates that the air permeability was less than 0.3 cm$^3$/(cm$^2$·sec). Regarding the comprehensive evaluation of the suction fixing sheets, the sheets were evaluated as × (poor) when the evaluation results of the maximum height of the protrusions included at least one × (poor), the sheets were evaluated as ⊚ (excellent) when the evaluation results of the maximum height of the protrusions were all ○ (good) and the evaluation result of the air permeability was ⊚ (excellent), the sheets were evaluated as ○ (good) when the evaluation results of the maximum height of the protrusions were all ○ (good) and the evaluation result of the air permeability was ○ (good), the sheets were evaluated as ○ (good) when the evaluation results of the maximum height of the protrusions included at least one Δ (acceptable) but the evaluation result of the air permeability was ⊚ (excellent), and the sheets that did not satisfy any of the above conditions were evaluated as Δ (acceptable).

TABLE 1

| | Thickness d1 of porous sheet (mm) | Thickness d2 of double-sided adhesive sheet or layer (μm) | Ratio d1/d2 | Through holes in substrate of double-sided adhesive sheet | |
| --- | --- | --- | --- | --- | --- |
| | | | | Opening diameter (mm) | Pitch (mm) |
| Ex. 1 | 1.0 | 85 | 11.8 | 2.0 | 3.0 |
| Ex. 2 | 0.45 | 40 | 11.3 | | |
| Ex. 3 | 0.30 | 30 | 10.0 | | |
| Ex. 4 | 0.70 | 85 | 8.2 | | |
| Comp. Ex. 1 | 0.30 | 40 | 7.5 | | |
| Comp. Ex. 2 | 0.30 | 85 | 3.5 | | |
| Ex. 5 | 1.0 | 85 | 11.8 | 0.8 | 1.8 |
| Ex. 6 | 0.45 | 40 | 11.3 | | |
| Ex. 7 | 0.30 | 30 | 10.0 | | |
| Ex. 8 | 0.70 | 85 | 8.2 | | |

TABLE 1-continued

|  | Thickness d1 of porous sheet (mm) | Thickness d2 of double-sided adhesive sheet or layer (μm) | Ratio d1/d2 | Through holes in substrate of double-sided adhesive sheet | |
|---|---|---|---|---|---|
|  |  |  |  | Opening diameter (mm) | Pitch (mm) |
| Comp. Ex. 3 | 0.30 | 40 | 7.5 | | |
| Comp. Ex. 4 | 0.30 | 85 | 3.5 | | |
| Ex. 9 | 1.0 | 85 | 11.8 | 1.5 | 2.5 |
| Ex. 10 | 0.45 | 40 | 11.3 | | |
| Ex. 11 | 0.30 | 30 | 10.0 | | |
| Ex. 12 | 0.70 | 85 | 8.2 | | |
| Comp. Ex. 5 | 0.30 | 40 | 7.5 | | |
| Comp. Ex. 6 | 0.30 | 85 | 3.5 | | |
| Ex. 13 | 0.30 | 7 | 42.9 | — | — |
| Ex. 14 | 0.30 | 21 | 14.3 | — | — |
| Ex. 15 | 0.30 | 31 | 9.7 | — | — |

TABLE 2

| | Air permeability of suction fixing sheet | | | | | |
|---|---|---|---|---|---|---|
| | Maximum height of protrusions (μm) | | | Frazier air permeability | | |
| | 5 kN | 10 kN | 50 kN | (cm³/(cm²·sec)) | Evaluation | Comprehensive evaluation |
| Ex. 1 | ○ | ○ | ○ | 0.8 | ○ | ○ |
| Ex. 2 | ○ | ○ | ○ | 1.2 | ◎ | ◎ |
| Ex. 3 | ○ | ○ | ○ | 1.6 | ◎ | ◎ |
| Ex. 4 | △ | △ | △ | 0.8 | ○ | △ |
| Comp. Ex. 1 | X | X | X | 1.6 | ◎ | X |
| Comp. Ex. 2 | X | X | X | 1.6 | ◎ | X |
| Ex. 5 | ○ | ○ | ○ | 0.36 | ○ | ○ |
| Ex. 6 | ○ | ○ | ○ | 0.54 | ○ | ○ |
| Ex. 7 | ○ | ○ | ○ | 0.72 | ○ | ○ |
| Ex. 8 | △ | △ | △ | 0.36 | ○ | △ |
| Comp. Ex. 3 | X | X | X | 0.72 | ○ | X |
| Comp. Ex. 4 | X | X | X | 0.72 | ○ | X |
| Ex. 9 | ○ | ○ | ○ | 0.65 | ○ | ○ |
| Ex. 10 | ○ | ○ | ○ | 0.98 | ○ | ○ |
| Ex. 11 | ○ | ○ | ○ | 1.3 | ◎ | ◎ |
| Ex. 12 | △ | △ | △ | 0.65 | ○ | △ |
| Comp. Ex. 5 | X | X | X | 1.3 | ◎ | X |
| Comp. Ex. 6 | X | X | X | 1.3 | ◎ | X |
| Ex. 13 | ○ | ○ | ○ | 3.5 | ◎ | ◎ |
| Ex. 14 | ○ | ○ | △ | 2.3 | ◎ | ○ |
| Ex. 15 | ○ | △ | △ | 1.7 | ◎ | ○ |

As shown in Tables 1 and 2, according to the suction fixing sheets of Examples 1 to 15 in which the ratio d1/d2 of the thickness d1 of the porous sheet to the thickness d2 of the double-sided adhesive sheet was 8.0 or more, the degree of change in shape caused on the surface of the suction target during the suction pressing could be suppressed as compared with the suction fixing sheets of Comparative Examples 1 to 6 in which the ratio d1/d2 was less than 8.0. In particular, according to the suction fixing sheets of Examples 1 to 3, 5 to 7, 9 to 11, 13, and 14 in which the ratio d1/d2 was 10.0 or more, the degree of change in shape could be suppressed more reliably.

The present invention is applicable to other embodiments as long as they do not depart from the spirit or essential characteristics thereof. The embodiments disclosed herein are to be considered in all respects as illustrative and not limiting. The scope of the invention is indicated by the appended claims rather than by the foregoing description, and all changes that come within the meaning and range of equivalency of the claims are intended to be embraced therein.

INDUSTRIAL APPLICABILITY

The suction fixing sheet according to the present invention is applicable to the same uses as conventional suction fixing sheets.

1: Suction fixing sheet
2: Porous sheet
3: Double-sided pressure-sensitive adhesive sheet
4: Through hole
31: Substrate
32a, 32b: Pressure-sensitive adhesive layer
33: Square lattice
34: Equilateral triangular lattice
5: Double-sided pressure-sensitive adhesive layer
6: Crosslinkable pressure-sensitive adhesive
7: Space
8: Opening
51: Suction unit
52: Suction surface
61: Suction target
62: Protrusion 63: Surface
64: Air suction

The invention claimed is:

1. A suction fixing sheet to be placed on a suction surface of a suction device to prevent contact between a suction target and the suction surface, the suction fixing sheet comprising:
    a porous sheet having air permeability in its thickness direction;
    a double-sided pressure-sensitive adhesive sheet provided with a substrate and having air permeability in its thickness direction, the double-sided pressure-sensitive adhesive sheet being disposed on one surface of the porous sheet, wherein
    a ratio of a thickness of the porous sheet to a thickness of the double-sided pressure-sensitive adhesive sheet is 8.0 or more and 11.8 or less, or
    a double-sided pressure-sensitive adhesive layer unprovided with a substrate, formed of a crosslinked pressure-sensitive adhesive, and having air permeability in its thickness direction, the double-sided pressure-sensitive adhesive layer being disposed on one surface of the porous sheet in contact with the one surface, wherein
    the double-sided pressure-sensitive adhesive layer is a single layer, an opposite side of the porous sheet side in the double-sided pressure-sensitive adhesive layer is exposed, and wherein
    a ratio of a thickness of the porous sheet to a thickness of the double-sided pressure-sensitive adhesive layer is 8.0 or more and 60.0 or less; and
    the air permeability of the suction fixing sheet in the thickness direction is 0.36 $cm^3/(cm^2 \cdot sec)$ or more as expressed in terms of Frazier number measured according to Method A for air permeability measurement (Frazier method) prescribed in JIS L 1096: 2010.

2. The suction fixing sheet according to claim 1, wherein the suction fixing sheet comprises the double-sided pressure-sensitive adhesive sheet.

3. The suction fixing sheet according to claim 1, wherein a lower limit of the ratio of the thickness of the porous sheet to the thickness of the double-sided pressure-sensitive adhesive sheet or the double-sided pressure-sensitive adhesive layer is at least 10.0.

4. The suction fixing sheet according to claim 1, wherein, in a region of the suction fixing sheet to be in contact with the suction target during suction holding of the suction target by the suction device, the double-sided pressure-sensitive adhesive sheet or the double-sided pressure-sensitive adhesive layer is disposed on the entire one surface of the porous sheet.

5. The suction fixing sheet according to claim 1, wherein the porous sheet is a sintered sheet of ultrahigh molecular weight polyethylene particles.

6. The suction fixing sheet according to claim 1, wherein the air permeability of the porous sheet in the thickness direction is more than 1.0 $cm^3/(cm^2 \cdot sec)$ as expressed in terms of Frazier number measured according to Method A for air permeability measurement (Frazier method) prescribed in JIS L 1096: 2010.

7. The suction fixing sheet according to claim 1, wherein the double-sided pressure-sensitive adhesive sheet has a plurality of through holes that pass through the double-sided pressure-sensitive adhesive sheet in the thickness direction.

8. The suction fixing sheet according to claim 7, wherein the through holes each have an opening in a circular shape or an oval shape.

9. The suction fixing sheet according to claim 7, wherein the through holes each have an opening area of 10 $mm^2$ or less.

10. The suction fixing sheet according to claim 7, wherein, in a region of the suction fixing sheet to be in contact with the suction target during suction holding of the suction target by the suction device, a percent open area of the through holes in the double-sided pressure-sensitive adhesive sheet is 15.0% or more.

11. The suction-fixing sheet according to claim 1, wherein pressure-sensitive adhesive layers of the double-sided pressure-sensitive adhesive sheet are each formed of a crosslinked pressure-sensitive adhesive.

12. The suction fixing sheet according to claim 1, wherein, in the double-sided pressure-sensitive adhesive sheet, a pressure-sensitive adhesive layer on the porous sheet side is formed of an acrylic pressure-sensitive adhesive and a pressure-sensitive adhesive layer on a side opposite to the porous sheet side is formed of a silicone pressure-sensitive adhesive.

13. The suction fixing sheet according to claim 1, wherein the double-sided pressure-sensitive adhesive layer is formed of a plurality of pieces of the crosslinked pressure-sensitive adhesive disposed spaced apart from each other on the one surface of the porous sheet.

14. The suction fixing sheet according to claim 13, wherein the plurality of pieces of the crosslinked pressure-sensitive adhesive are disposed in stripes when viewed in a direction perpendicular to the one surface of the porous sheet.

* * * * *